United States Patent
Mao et al.

(10) Patent No.: US 10,320,568 B1
(45) Date of Patent: Jun. 11, 2019

(54) PROTOCOL-INDEPENDENT MULTI-TABLE PACKET ROUTING USING SHARED MEMORY RESOURCE

(71) Applicant: Google LLC, Mountain View, CA (US)

(72) Inventors: Yuhong Mao, Fremont, CA (US); Richard Lee Sites, Menlo Park, CA (US); Uday Ramakrishna Naik, Fremont, CA (US); Manoj Kasichainula, Mountain View, CA (US)

(73) Assignee: Google LLC, Mountain View, CA (US)

( * ) Notice: Subject to any disclaimer, the term of this patent is extended or adjusted under 35 U.S.C. 154(b) by 206 days.

(21) Appl. No.: 14/734,602

(22) Filed: Jun. 9, 2015

(51) Int. Cl.
*H04L 9/32* (2006.01)
*H04L 29/06* (2006.01)
*H04L 12/743* (2013.01)

(52) U.S. Cl.
CPC .......... *H04L 9/3242* (2013.01); *H04L 9/3247* (2013.01); *H04L 45/7453* (2013.01); *H04L 63/1416* (2013.01); *H04L 2209/24* (2013.01); *H04L 2209/64* (2013.01)

(58) Field of Classification Search
CPC .. H04L 69/22; H04L 63/0222; H04L 63/1416
USPC ........................................................ 713/176
See application file for complete search history.

(56) References Cited

U.S. PATENT DOCUMENTS

| | | | |
|---|---|---|---|
| 5,914,938 A | 6/1999 | Brady et al. | |
| 6,223,172 B1 | 4/2001 | Hunter et al. | |
| 6,266,705 B1 | 7/2001 | Ullum et al. | |
| 6,674,769 B1* | 1/2004 | Viswanath | H04L 45/742 370/469 |
| 6,735,670 B1 | 5/2004 | Bronstein et al. | |
| 6,754,662 B1* | 6/2004 | Li | H04L 45/00 707/693 |
| 7,089,240 B2 | 8/2006 | Basso et al. | |
| 7,417,950 B2* | 8/2008 | Hofmeister | H04L 12/4633 370/230 |
| 7,624,446 B1* | 11/2009 | Wilhelm | H04L 63/1416 380/255 |
| 7,725,886 B2* | 5/2010 | Kunze | H04L 47/24 717/159 |
| 8,625,604 B2 | 1/2014 | Bando et al. | |
| 8,854,972 B1* | 10/2014 | Li | H04L 47/12 370/235 |
| 9,473,394 B1* | 10/2016 | Sivaramakrishnan | H04L 45/7453 |
| 9,755,972 B1* | 9/2017 | Mao | H04L 45/7453 |
| 2006/0083227 A1* | 4/2006 | Eldar | H04L 29/25 370/389 |

(Continued)

*Primary Examiner* — Bryan F Wright
(74) *Attorney, Agent, or Firm* — Lerner, David, Littenberg, Krumholz & Mentlik, LLP (57) ABSTRACT

A system and method for protocol independent multi-flow table routing includes a first flow table, a second flow table, and a shared hash table accessible by both the first flow table and the second flow table. Upon receipt of a packet, a first secure signature of a first lookup key is generated for the first flow table, and a second secure signature of a second lookup key is generated for the second flow table. The shared hash table stores both the first secure signature in association with a first value corresponding to the first secure signature, and the second secure signature along with a second value corresponding to the second secure signature. The first and second values indicate destination information for the packet.

18 Claims, 7 Drawing Sheets

(56) References Cited

U.S. PATENT DOCUMENTS

| | | | |
|---|---|---|---|
| 2010/0023726 A1* | 1/2010 | Aviles | G06F 12/0813 711/216 |
| 2012/0170585 A1* | 7/2012 | Mehra | H04L 45/24 370/400 |
| 2013/0329557 A1* | 12/2013 | Petry | H04L 63/0272 370/235 |
| 2014/0086178 A1 | 3/2014 | Wang et al. | |
| 2014/0301394 A1* | 10/2014 | Arad | H04L 45/7453 370/392 |
| 2014/0317405 A1* | 10/2014 | Johnson | H04L 63/0227 713/164 |
| 2015/0242429 A1* | 8/2015 | Varvello | H04L 45/7453 707/752 |
| 2015/0341473 A1* | 11/2015 | Dumitrescu | H04L 69/22 370/392 |

\* cited by examiner

PROTOCOL-INDEPENDENT MULTI-TABLE PACKET ROUTING USING SHARED MEMORY RESOURCE

BACKGROUND

Figure 1A:
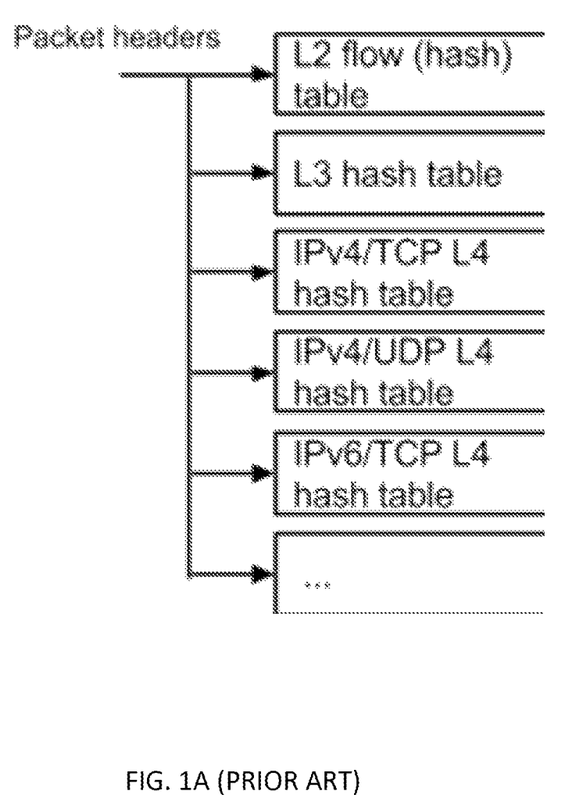
FIG. 1A is illustrates a prior art system.

A high speed networking chip typically performs a sequence of flow table lookups in order to route any input packet to its final destination. As shown in FIG. 1A, each flow table has a dedicated memory that holds table specific key/value pairs, and each table performs a lookup using a fixed lookup key. For a layer 2 (L2) bridging table, the lookup key is typically a virtual local area network and a media access control destination address {VLAN, MAC_DA} for a classical L2 network, or {Virtual network ID, MAC_DA} for a virtualized L2 network. For a layer 3 (L3) host routing table, the lookup key is typically {IPv4_DA} or {IPv6_DA}. For multiprotocol label switching (MPLS), the lookup key is an MPLS label. For a layer 4 (L4) service routing table, the lookup key is typically {IPv4_SA, IPv4_DA, IP_protocol, source_port, dest_port} for IPv4 transport, or {IPv6_SA, IPv6_DA, IP_protocol, source_port, dest_port} for IPv6 transport.

The flow table is fixed to a specific network protocol due to its fixed lookup key construction. Additionally, the lookup key sizes for different flow tables can vary greatly. For example, an L2 {VLAN,DA} lookup key is 8 bytes, an IPv4 5-tuple lookup key is 13 bytes, and an IPv6 5-tuple lookup key is 37 bytes.

Current network interface controller (NIC) implementations either deliver all packets to one place, for software to decode, or have wired-in restricted hardware routing for perhaps four different sequences of headers: {Link, IPv4, TCP}; {Link, IPv4, UDP}; {Link, IPv6, TCP}; {Link, IPv6, UDP}. All other packets are routed to one place for software (or NIC firmware) to decode. None of the software-based results can be routed at anything near line rate, and typically slowed by a factor of 10. A user of such chips cannot have a much-different distribution of packets, such as 100% IPv6/UDP, without overflowing one small dedicated routing table and under-utilizing all the others. An overflowed table means packets for all connections whose routing doesn't fit go to software and suffer a significant slowdown.

BRIEF SUMMARY

In one aspect, a system includes one or more memories storing a first flow table, a second flow table, and a shared hash table accessible by both the first flow table and the second flow table. One or more processors in communication with the one or more memories are configured to generate, for the first flow table, a first secure signature of a lookup key of the first flow table, generate, for the second flow table, a second secure signature of a lookup key for the second flow table, store, in the shared hash table, the first secure signature and a first value corresponding to the first secure signature, and store, in the shared hash table, the second secure signature and a second value corresponding to the second secure signature. The one or more processors, in generating the first secure signature, are further configured to detect protocol headers of an incoming packet, select one or more sets of bytes of a packet of the incoming packet based on the detected protocol headers, construct a header n-tuple vector using the selected sets of bytes, form a hash vector by appending a unique flow table identifier programmed for the first table to the header n-tuple vector, and hash the hash vector with a secret hash key.

Another aspect provides a method, including generating, for a first flow table, a first secure signature of a lookup key of the first flow table, and generating, for a second flow table, a second secure signature of a lookup key for the second flow table. The method further includes storing, in a shared hash table, the first secure signature and a first value corresponding to the first secure signature, and storing, in the shared hash table, the second secure signature and a second value corresponding to the second secure signature. Generating the first secure signature may include detecting one or more protocol headers of an incoming packet, selecting one or more sets of bytes of a packet of the incoming packet based on the detected protocol headers, constructing a header n-tuple vector using the selected sets of bytes, forming a hash vector by appending a unique flow table identifier programmed for the first table to the header n-tuple vector, and hashing the hash vector with a secret hash key.

In yet another aspect, a chip includes one or more ingress ports for receiving data packets, one or more destinations for sending outgoing data packets, and a memory storing a hash table, the hash table being accessible by a plurality of different flow tables. The chip is adapted to receive an incoming data packet having any combination of headers, generate a first lookup key signature based on a first header and a first of the plurality of different flow tables, access the hash table, using the generated first lookup key signature, to determine destination information for the packet, and transmit the packet based on the destination information. The packet destination may be, for example, a specific software queue in memory or an egress port. In some examples, an instruction to drop the packet may be included in the destination information.

DETAILED DESCRIPTION

The present disclosure provides a chip capable of performing protocol-independent multiple table routing using a shared memory resource. Network packets generally have multiple protocol headers at the front of each packet. For example, one packet may have 14 bytes of link protocol header, followed by 20 bytes of outer IPv4 header, followed by 28 bytes of outer TCP header including some optional fields, followed by 20 bytes of General Routing Encapsulation (GRE) header, followed by 40 bytes of inner IPv6 header, followed by 8 bytes of inner User Datagram Protocol (USP) header, followed by data. A next packet may have a different combination of headers. Another packet may have a sequence of one or more protocols that have not yet been developed. The chip described herein is capable of routing packets having arbitrary, unpredictable, and unknown combinations of headers at full line speed using a shared hash table.

The chip, for example, may include one or more flow tables. Multiple flow tables, regardless of the combinations of routing protocols used, each utilize a single logical hash table implemented on a single pool of memory resources to forward packets.

Each flow table constructs a secure signature of its lookup key. The signature is stored in the shared hash table in association with a value indicating where to send an incoming packet matching the lookup key. The shared table may include any number of entries, including entries for different flow identifiers/protocols.

To construct the secure signature of the lookup key, an N-tuple definition is programmed in the flow table for one or a combination of protocol headers that may appear in any incoming packet. The protocol headers may be any headers that can be detected in an incoming packet. The definition can be, for example, a byte- or bit-mask of the first N bytes of the packet for any incoming packet. Accordingly, sets of bytes of the packet headers may be selected. The sets of bytes may be nonconsecutive. The selected sets of bytes are then concatenated, thereby forming a header N-tuple vector. Because the definition is configurable and protocol-independent, the packet routing pipeline hardware is programmable without sacrificing processing speed. Because the N-tuple vector is a compacted vector of the selected sets of bytes from the packet header fields, a single key signature can be shared for packets having optional header field variations. For example, while some packets of a same protocol may include IP options or TCP options and other may not, these packets may nevertheless use the same key signature.

A hash vector is formed based on at least the header N-tuple vector. For example, a unique flow table identifier for the flow table is pre-appended to the header N-tuple vector. The unique flow table identifier may be assigned during manufacture, during network setup, as an update, or at any other time. Metadata from the incoming packet may also be pre-appended to the header N-tuple vector, for example, between the flow table identifier and the header N-tuple vector. The hash vector may also be zero-padded to a fixed length. In this regard, the lookup signature for every flow table may be a same size.

The hash vector, along with a secret hash key, is used to generate a strong lookup key signature. For example, the hash vector and secret hash key may be crypto hashed using a secure hash or simple hash. In some examples, the crypto hash has at least 128-bit crypto strength. For example, the crypto-hash could be a keyed-hash message authentication code (HMAC) with a strong SHA3 hash function. The flow table identifier in the hash vector may help to eliminate hash collision across different flow tables during the crypto hash.

Once the shared hash table is populated with the various lookup key signatures for the multiple flow tables, the tables may be used to route incoming packets. For example, when a first flow table receives a packet, it detects the packet protocols based on the packet headers, and applies a corresponding definition to select sets of bytes from the incoming packet headers. The selected bytes are then concatenated, and the first flow table's identifier and metadata are pre-appended to it, and the result is zero-padded to a pre-defined length. It is then crypto-hashed with a secret hash key to generate the lookup key signature. The lookup key signature may then be used to determine, from the shared hash table, a next hop for the incoming packet.

The protocol-independent multi-table routing with shared memory may be used, for example, in a switch chip or a network interface controller (NIC). For example, in a switch chip, a first flow table can be configured as an L2 bridging table, a second flow table can be configured as a IPv4 host routing table, and a third flow table can be configured as a IPv6 host routing table. All three of these flow tables can share a single hash table over a shared pool of memory resources. In the example of a NIC chip, a first flow table can be configured as an L4 firewall or service routing table over virtualized networks, a second table can be configured as an L2/L3 based guest for virtual machine forwarding. Both flow tables can share a single hash table with dynamic resource allocation.

The above-described features are advantageous in that they provide for versatility of network chips, which results in reduced costs for updates and efficient use of resources. For example, the routing is protocol independent, and does not assume any fixed distribution of packet headers. Packet distribution uses all available hardware resources. Moreover, every flow table performs a lookup of a secure lookup signature of the same size. Accordingly, the lookup tables for all the flow tables can be implemented as a shared hash table over a single pool of memory resources, and the hash table entries can be dynamically allocated to each flow table for efficient sharing of memory resources in the networking chip.

Figure 1B:
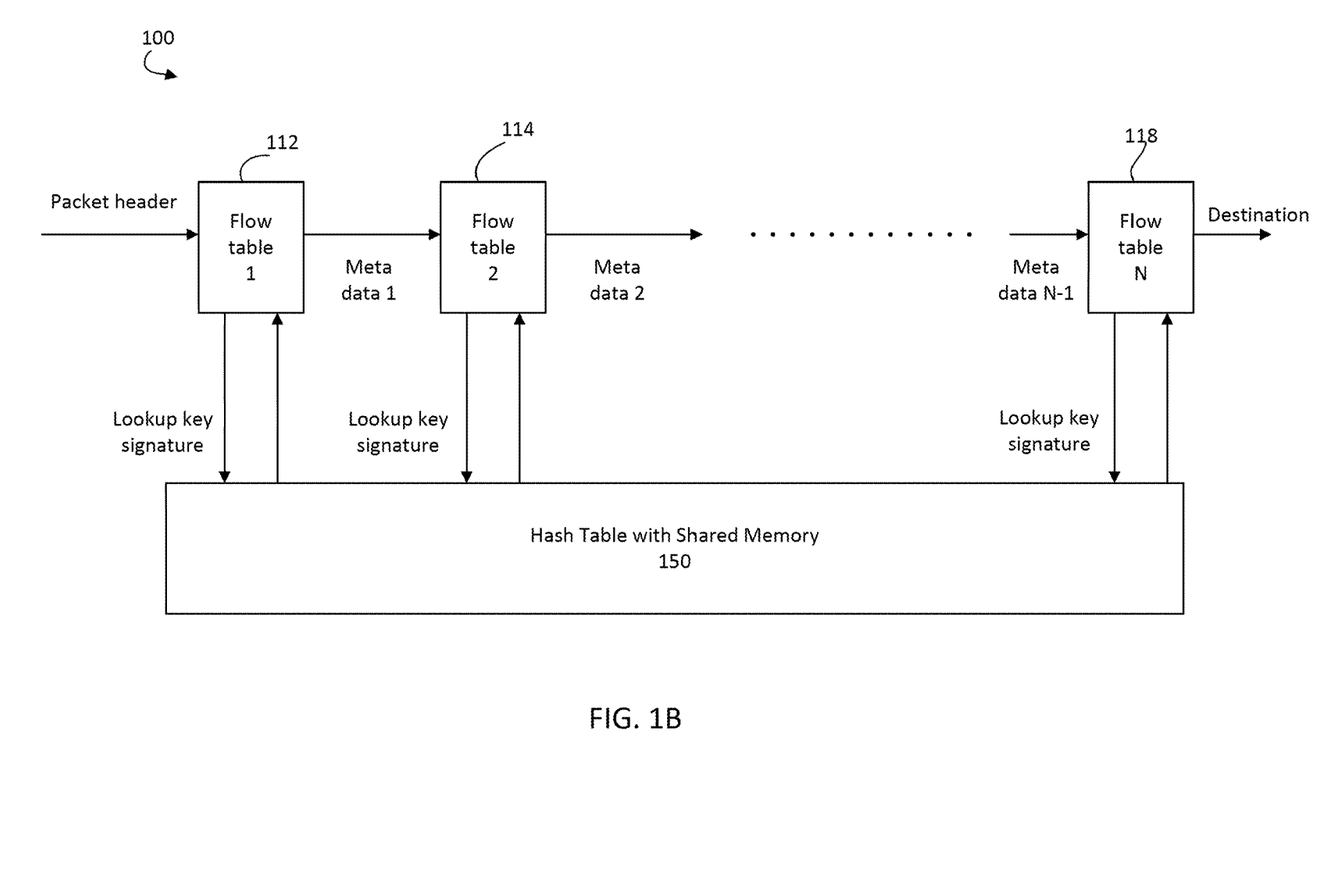
FIG. 1B is an example system diagram in accordance with aspects of the disclosure.

FIG. 1B illustrates a system 100, including multiple flow tables 112, 114, 118 which share hash table 150. Packets are received at first flow table 112. The first flow table 112 may be capable of routing packets using any combination of routing protocols. For example, the flow table 112 may receive a packet with packet headers including any combination of UDP, GRE, IPv4, IPv6, TCP, or other protocol headers, including future protocols that are not yet developed. To determine the combination of protocol headers in the received packet, the flow table 112 may detect a pattern across a predetermined number of bytes, such as the first 128 bytes of the header.

In routing the packet, the first flow table 112 accesses shared hash table 150 using a lookup key signature. The lookup key signature is generated by the first flow table 112 based on one or more protocol headers detected in the incoming packet. The shared hash table 150 provides a value corresponding to the lookup key signature, which value is a destination or other information used to further route the packet.

In the example of FIG. 1B, the packet is further routed from the first flow table 112 to second flow table 114, along with metadata from the first flow table. The second flow table may also be capable of routing packets using any combination of protocols. The second lookup key signature is used by the second flow table 114 to access the same hash table 150 as was accessed by the first flow table 112. Similarly, another entry, corresponding to the second lookup key signature, indicates where to send the packet next. This process continues, using the same shared hash table 150 and further flow tables 118, until the packet reaches its destination. While only a few flow tables 112, 114, 118 are shown, it should be understood that any number of flow tables may share the hash table 150. Each flow table 112-118 is capable of routing packets having any combination of protocol headers, including protocols that are not yet developed.

According to one example, the first flow table 112 and the second flow table may compute hashes of different sets of header bytes. The entire hash table is available to route whatever combination of packet traffic actually occurs, rather than using multiple small hash tables and having one be too small for a given set of traffic.

In some circumstances, such as with encapsulated or tunneled packets, an initial routing or processing may be determined by flow table 112 from some initial headers, and then a subsequent routing may be determined from later headers. For example, if a packet had an outer IPv4 header and outer TCP header and outer GRE header, it might be partially processed based on those, for example to confirm that the sender IP address is allowed to communicate with the destination TCP port. For example, a destination in shared hash table 150 corresponding to the first lookup key signature of the first flow table 112 may indicate that more protocol headers of the packet should be detected. Accordingly, the first flow table 112 may send the packet to the second flow table 114 along with a few bytes of metadata from the flow table 112 signifying access allowed or disallowed for a particular target software process. The packet may be further routed by the flow table 114 based on, for example, the metadata, an inner IPv6 header, and inner TCP header.

Figure 2:
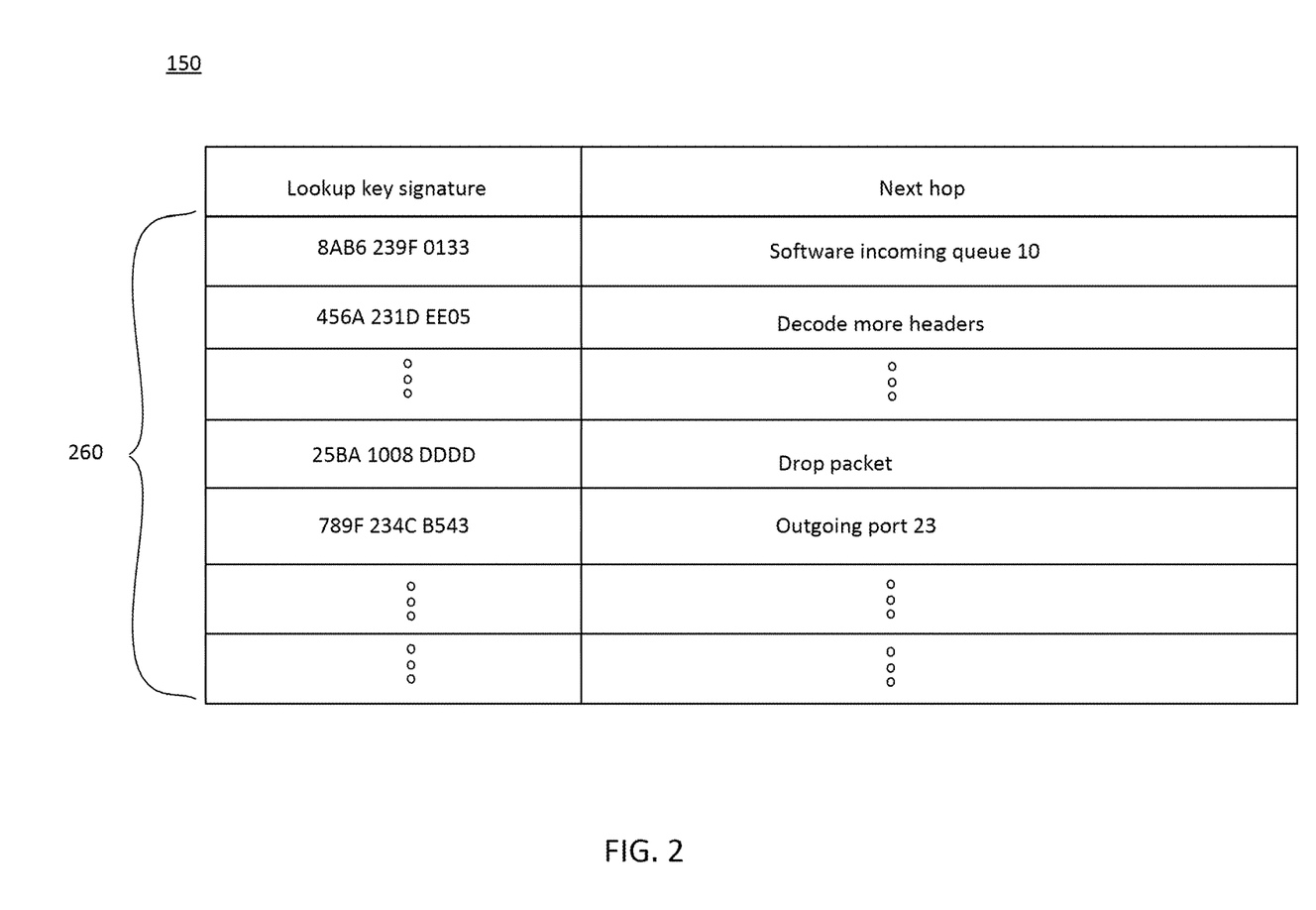
FIG. 2 is an example shared hash table in accordance with aspects of the disclosure.

FIG. 2 illustrates an example of the shared hash table 150. The table 150 includes a number of entries 260, each entry correlating a lookup key signature and destination information, such as a next hop where to send the packet. For example, the destination information may identify a particular software incoming queue in memory. In other examples, the destination information may indicate that more protocol headers should be decoded or that the packet should be dropped. In a switch chip design, for example, the destination information may identify a particular egress port.

The lookup key signatures are generated by the flow tables, as described in further detail below in connection with FIG. 3. The entries 260 in the hash table 260 may be updated with lookup key signatures when new protocols are developed. In this regard, hardware implementing the flow tables and hash table need not be replaced to accommodate new routing protocols. While only a few entries 260 are shown in FIG. 2, it should be understood that any number of entries may be included in the shared hash table 150. For example, the shared hash table 150 may include up to 20,000 or more entries.

Figure 3:
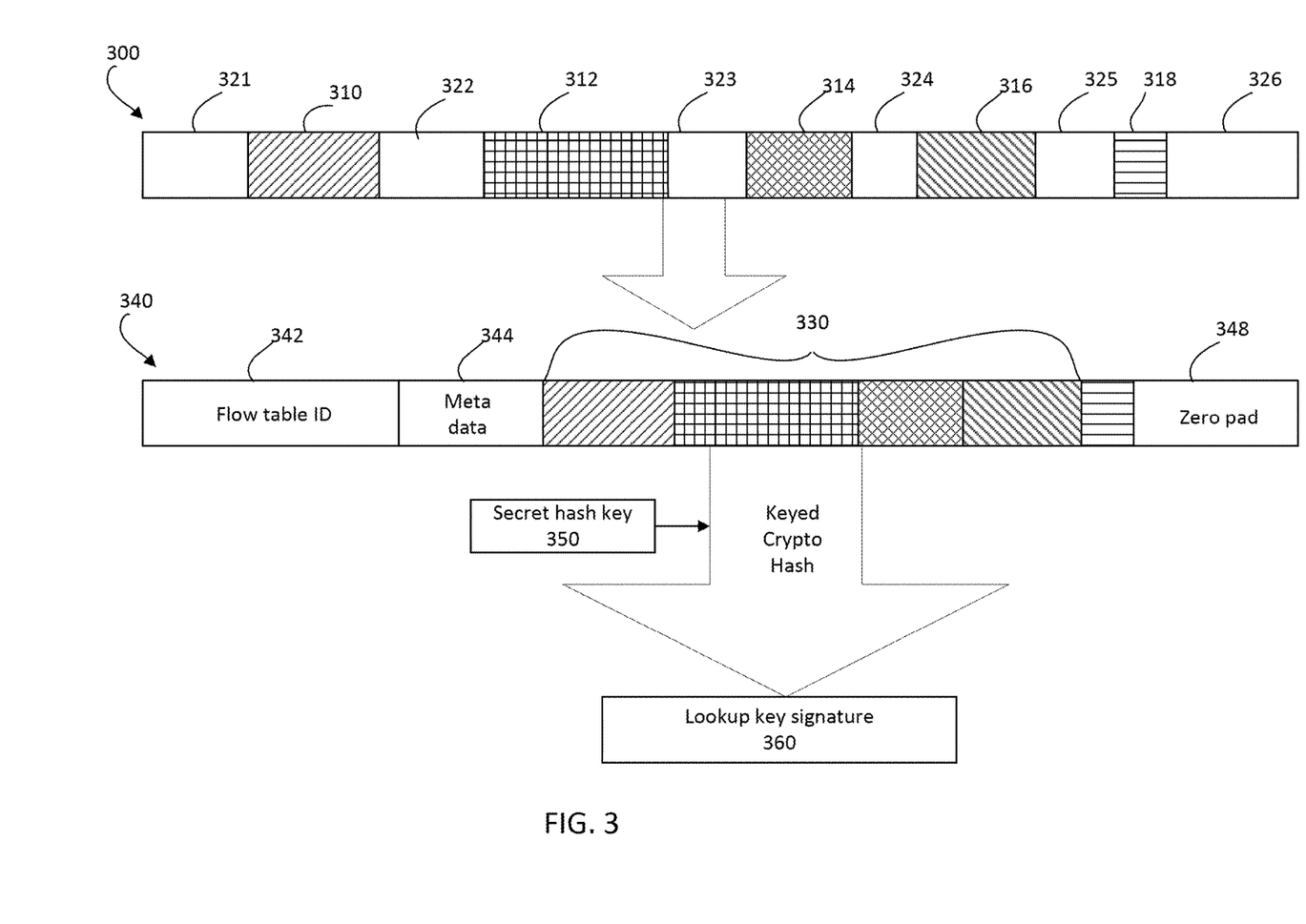
FIG. 3 illustrates an example of generating lookup key signatures in accordance with aspects of the disclosure.

FIG. 3 provides an example of generating the lookup key signature for a packet. An N-tuple definition is applied to a packet header 300. The N-tuple definition may be programmed in the flow table for one or more protocol headers detected in the packet. For example, referring back to FIG. 1B, if the first flow table 112 detects that a first number of bytes in the packet include a link protocol header, IPv4 protocol header, and TCP protocol header, a first N-tuple definition may be applied. If the first flow table 112 detects that the first number of bytes in the packet include a link protocol header, a GRE protocol header, and an IPv6 protocol header, a second N-tuple definition may be applied.

The N-tuple definition, regardless of the protocol or combination of protocols, may be a bit- or byte-mask of the first N bytes of the packet. For example, referring back to FIG. 3, applying the byte mask may result in bytes 310, 312, 314, 316, and 318 of the packet header 300 being selected. While five sets of bytes are selected in FIG. 3, the definition may select any number of sets of bytes in any arrangement.

The selected sets of header bytes 310-318 are compacted and concatenated into header N-tuple vector 330. Unselected bytes, such as 321-326, may be ignored.

A flow table identifier 342 and metadata 344 are preappended to the header N-tuple vector. The flow table ID 342 is a unique identifier programmed for each flow table. The metadata 344 may be a few additional bytes from the processing by a previous flow table. The flow table ID 342, metadata 344, and header N-tuple vector 330 form hash vector 340. The hash vector 340 may be zero padded 348 to a predetermined length.

The padded hash vector 340 is hashed, for example, using a keyed crypto hash. The hash vector 340 may be hashed with a secret hash key 350, such as a secure hash key. The hashing generates a strong lookup key signature 360. The lookup key signature 360, as mentioned above, is used to access the shared hash table.

Figure 4:
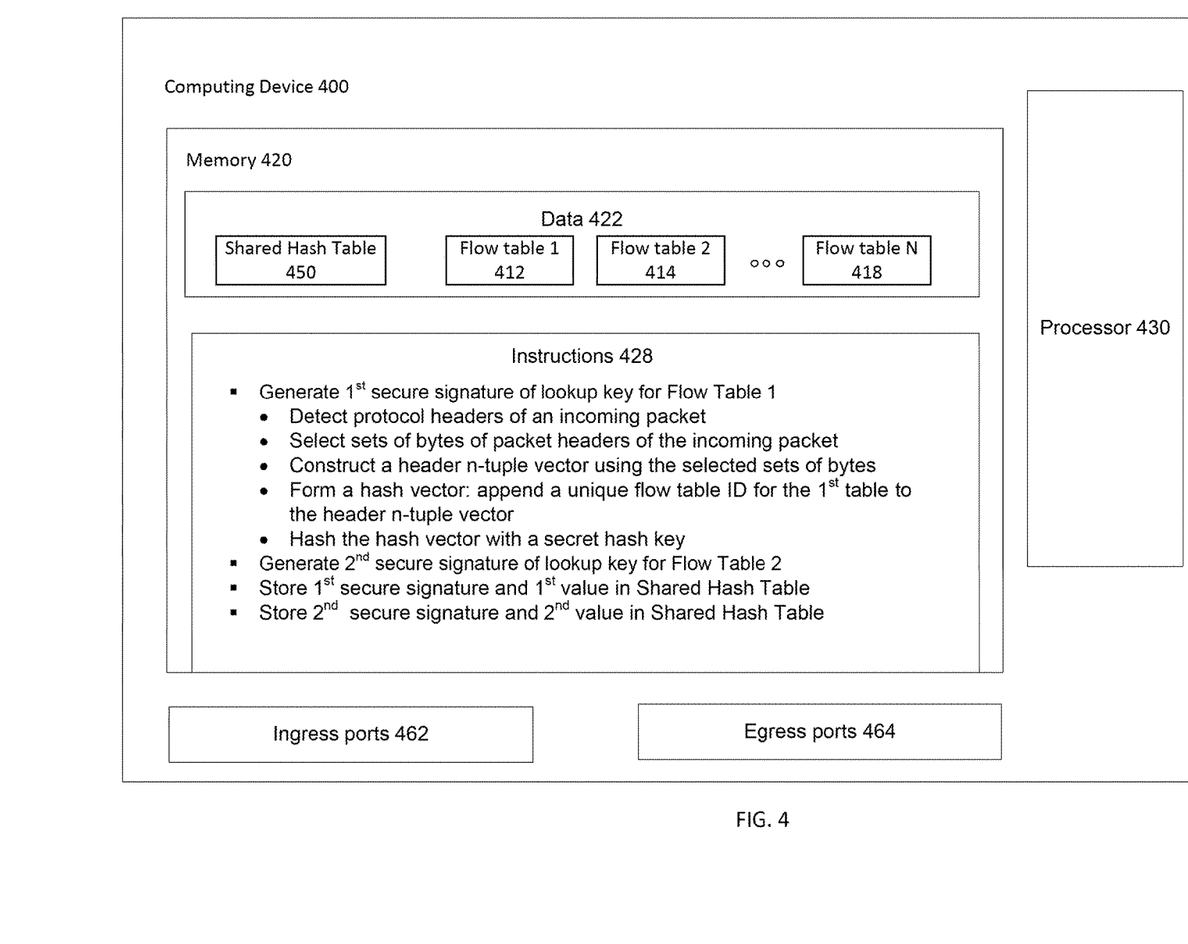
FIG. 4 is an example computing device in accordance with aspects of the disclosure.

FIG. 4 illustrates an example computing device 400 implementing the multi-flow table routing with shared hash table described above. The computing device 400 may be, for example, an application specific integrated circuit (ASIC), such as a switch chip or a network interface controller (NIC). In other examples, the computing device 400 may be any network component or device capable of receiving and forwarding data or data packets to appropriate destinations of a computer network, such as a network router, a switch, a hub, etc. While only one computing device 400 is shown, numerous computing devices may be interconnected. For example, the computing devices may be wired or wirelessly connected. The computing device 400 may be used for routing packets, for example through a system, datacenter, or network.

The computing device 400 may support various routing protocols, such as link, IPv, IPv6, TCP, UDP, GRE, Internet Control Message, VLAN, etc. Moreover, the computing device 400 may support protocols that have not yet been developed. The computing device 400 may provide a dedicated, full-time connection to a network and also have hardware capable of processing instructions and data stored in the one or more memories. For example, the computing device 400 may be a computer hardware component that may deliver an incoming packet to one or more queues in a computing device's main memory to be forwarded to other network components. In addition, the computing device 400 may provide the connection to other network devices via a wired connection or a wireless connection.

The computing device 400 may include one or more processors 430, one or more memories 420, as well as other components, such as any other hardware used for routing data packets through a network. For example, in one example the computing device 400 may be a switch chip inside a network switch, and may include ingress and egress ports 462, 464. In another example the computing device 400 may be a NIC, and may include a CPU interface (not shown).

The memory 420 may store information accessible by the one or more processors 430, including data 422 instructions 428 that may be executed or otherwise used by the one or more processors 430. For example, memory 420 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 420 may be a static random-access memory (SRAM) configured to provide fast lookups. Systems and methods may include different combinations of the foregoing, whereby different portions of the instructions and data are stored on different types of media.

The data 422 may be retrieved, stored or modified by the one or more processors 430 in accordance with the instructions 428. For instance, data 422 may include shared hash table 450, and one or more flow tables 412, 414, 418 which share the hash table 450. In accordance with the instructions 428, secure signatures of lookup keys may be generated for each of the flow tables 412-418 and stored in the shared hash table 450. Although the claimed subject matter is not limited by any particular data structure, the data may be stored in computing device registers, in a relational database as a table having a plurality of different fields and records, XML documents or flat files. The data may also be formatted in any computing device-readable format.

The instructions 428 may be any set of instructions to be executed directly (such as machine code) or indirectly (such as scripts) by the one or more processors 430. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 430 may be logic circuitry (e.g., logic gates, flip-flops, etc.) hard-wired into the computing device 400 itself or may be a dedicated application specific integrated circuit (ASIC). It should be understood that the one or more processors 430 are not limited to hard-wired logic circuitry, but may also include any commercially available CPU, or any hardware-based processors, such as a field programmable gate array (FPGA).

Although FIG. 4 functionally illustrates the processor, memory, and other elements of computing device 400 as being within the same block, it will be understood by those of ordinary skill in the art that the processor and memory may actually include multiple processors and memories that may or may not be stored within the same physical housing. For example, memory 420 may be a volatile memory or other type of memory located in a casing different from that of computing device 400. Accordingly, references to a processor or memory should be understood to include a collection of processors and memories that may or may not operate in parallel. Moreover, the various components described above may be arranged on one or more circuit boards, one or more NICs, or part of one or more computing devices.

In addition to the operations described above, various operations will now be described. It should be understood that the following operations do not have to be performed in the precise order described below. Rather, various operations can be handled in a different order or simultaneously, and operations may also be added or omitted.

Figure 5:
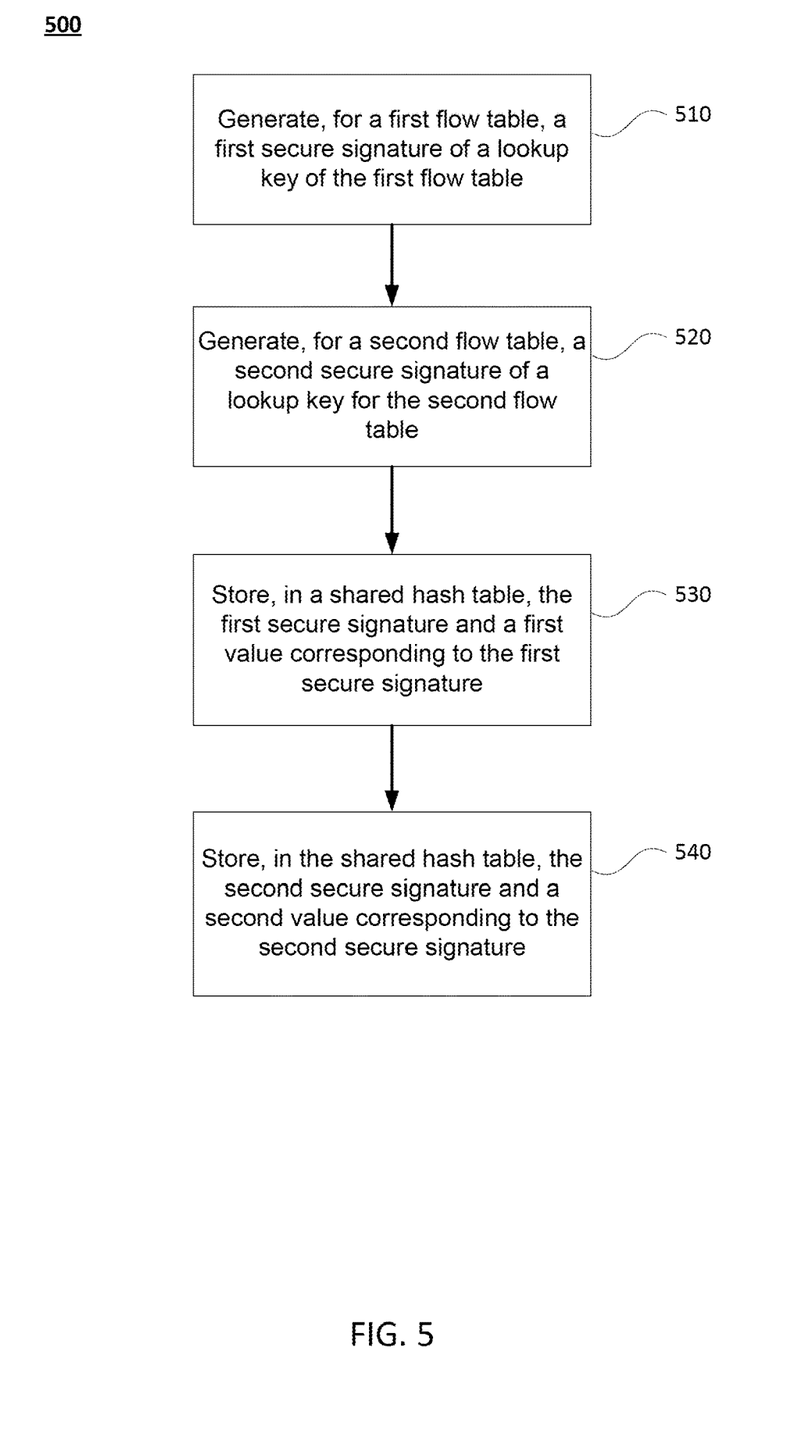
FIG. 5 is an example flow diagram illustrating a method of creating routing table entries in accordance with aspects of the disclosure.

FIG. 5 provides a flow diagram illustrating an example method 500. The method 500 may be performed, for example, in building a shared hash table. While the method refers to a first flow table and a second flow table, the method 500 may be expanded to cover any number of flow tables sharing the same hash table.

In block 510, a first secure signature of a lookup key of the first flow table is generated. In block 520, a second secure signature of a lookup key for the second flow table is generated. The first flow table and the second flow table may each use the same or different routing protocols, and may be used to route a same packet using different headers of the same packet.

In block 530, the first secure signature is stored in a shared hash table along with a corresponding first value. The first value identifies where packets will be sent when their lookup key signature matches the first secured signature. For example, the value may identify an outgoing port of the first flow table, an outgoing port of the computing device, a receive queue of another computing device, etc.

In block 540, the second secure signature is also stored in the shared hash table, along with a corresponding second value. The second value, similar to the first value, indicates where to send a packet with a lookup key signature matching the second secure signature. In this regard, the shared hash table entries may be dynamically allocated.

Figure 6:
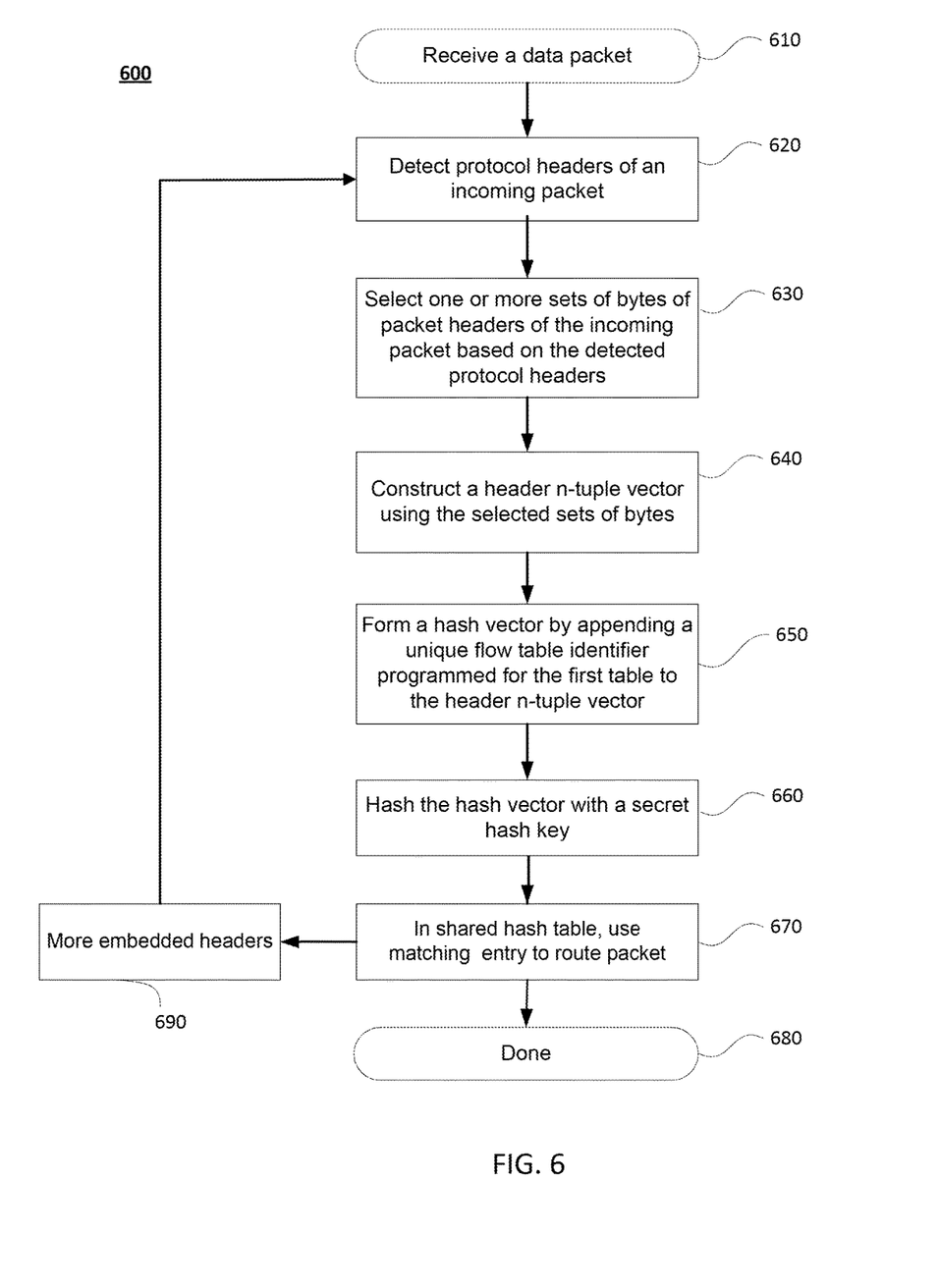
FIG. 6 is another example flow diagram illustrating a method of routing in accordance with aspects of the disclosure.

FIG. 6 illustrates an example method 600 of generating a secure lookup key. The method 600 may be performed, for example, in performing multiple flow table routing of packets. At block 610, a NIC, switch chip, or other computing device capable of reading packet content may receive a data packet to be queued in the computing device's memory and eventually forwarded to a particular network destination.

Upon receipt of the data packet, the computing device may detect (block 620) a protocol header of the packet. For example, the computing device may read a predetermined number of bytes from a first data packet and match the bytes to a plurality patterns stored in a memory. The memory may store, in correlation with the pattern, an identification of the protocol type.

In block 630, one or more sets of bytes of the packet headers are selected based on the detected protocol header. For example, the memory may include a table identifying a definition corresponding to the detected protocol. The definition may include mask bits, mask bytes, or other types of information identifying the portions of the data packet to be selected. The definitions stored in the memory may be updated in order to accommodate new types of protocols. For example, new definitions for newly developed protocols may be added, or old definitions for obsolete protocols may be removed.

In block 640, a header N-tuple vector is constructed using the selected sets of bytes. For example, the selected sets of bytes may be compacted and concatenated, as described in connection with FIG. 3.

In block 650, a hash vector is formed. The hash vector may include the header N-tuple vector, with a unique flow identifier for the first table pre-appended thereto. Metadata may also be include and pre-appended to the header N-tuple vector. In some examples, the hash vector is zero-padded such that the resulting hash vector has a predetermined length. In this regard, each hash vector generated by different flow tables may have a consistent length, thereby facilitating use of a shared hash table among the different flow tables.

In block 660, the hash vector is hashed with a secret hash key, resulting in the lookup key signature. The hash function used for this hash may be a secure hash or a simple hash.

In block 670, an entry in a shared table corresponding to the hash resulting from block 660 is used to route the packet. For example, the entry may include destination information. In some examples, the destination information may identify a destination such as a software incoming queue. In this case, the method 600 may terminate at block 680. In other examples, the destination information may indicate that more headers should be decoded (block 690). In this case, the method 500 may return to block 620 for further routing, for example, by a second flow table.

The above-described aspects of the disclosure may be advantageous in that that a network device may be able to route packets to various destinations at a full line rate regardless of the protocols associated with the packets.

Moreover, the above-described features provide for versatility of network chips, which results in reduced costs for updates and efficient use of resources. For example, the routing is protocol independent, and does not assume any fixed distribution of packet headers. Packet distribution uses all available hardware resources. Further, every flow table performs a lookup of a secure lookup signature of the same size. Accordingly, the lookup tables for all the flow tables can be implemented as a shared hash table over a single pool of memory resources, and the hash table entries can be dynamically allocated to each flow table for efficient sharing of memory resources in the networking chip.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. The examples and other arrangements may be devised without departing from the spirit and scope of the subject matter defined by the appended claims. Further, the same reference numbers in different drawings can identify the same or similar elements.

The invention claimed is:

1. A system comprising:
one or more memories storing a first flow table, a second flow table, and a shared hash table accessible by both the first flow table and the second flow table, wherein the first flow table and the second flow table are capable of routing packets having any combination of protocol headers, including protocol headers for protocols that were not yet developed at a time the shared hash table was developed;
one or more processors in communication with the one or more memories, the one or more processors configured to:
generate, in response to receiving a first packet at the first flow table, a first secure signature of a lookup key of the first flow table;
generate, in response to receiving the first packet at the second flow table, a second secure signature of a lookup key for the second flow table;
store, in the shared hash table, the first secure signature and a first value corresponding to the first secure signature; and
store, in the shared hash table, the second secure signature and a second value corresponding to the second secure signature.

2. The system of claim 1, wherein the one or more processors, in generating the first secure signature, are further configured to:
detect one or more protocol headers of the first packet;
select one or more sets of bytes of the first packet based on the detected one or more protocol headers;
construct a header N-tuple vector using the selected sets of bytes;
form a hash vector by appending a unique flow table identifier programmed for the first table to the header N-tuple vector; and
hash the hash vector with a secret hash key.

3. The system of claim 2, wherein the one or more memories further store at least one N-tuple definition in association with the first flow table, the N-tuple definition corresponding to the detected one or more protocol headers.

4. The system of claim 3, wherein the N-tuple definition is a mask of a first number of bytes of the packet header.

5. The system of claim 2, wherein forming the hash vector further comprises pre-appending metadata to the N-tuple vector.

6. The system of claim 2, wherein the one or more processors are further configured to pad the hash vector to a predetermined length.

7. The system of claim 2, wherein hashing the hash vector comprises using a keyed secure crypto hash.

8. The system of claim 1, wherein the first and second values designate routing destinations for packets which produce corresponding lookup keys.

9. A method, comprising:
generating, in response to receiving a first packet at a first flow table, a first secure signature of a lookup key of the first flow table;
generating, in response to receiving the first packet at a second flow table, a second secure signature of a lookup key for the second flow table;
storing, in a shared hash table, the first secure signature and a first value corresponding to the first secure signature; and
storing, in the shared hash table, the second secure signature and a second value corresponding to the second secure signature,
wherein the first flow table and the second flow table are capable of routing packets having any combination of protocol headers, including protocol headers for protocols that were not yet developed at a time the shared hash table was developed.

10. The method of claim 9, wherein generating the first secure signature comprises:
detecting one or more protocol headers of the first packet;
selecting one or more sets of bytes of the first packet based on the detected one or more protocol headers;
constructing a header N-tuple vector using the selected sets of bytes;
forming a hash vector by appending a unique flow table identifier programmed for the first table to the header N-tuple vector; and
hashing the hash vector with a secret hash key.

11. The method of claim 10, wherein selecting one or more sets of bytes of the first packet comprises programming an N-tuple definition in the first flow table for the one or more protocol headers detected in a given packet.

12. The method of claim 11, wherein the N-tuple definition is a mask of a first number of bytes of the packet header.

13. The method of claim 10, wherein forming the hash vector further comprises pre-appending metadata to the N-tuple vector.

14. The method of claim 10, further comprising zero padding the hash vector.

15. The method of claim 10, wherein hashing the hash vector comprises using a keyed secure crypto hash.

16. The method of claim 9, wherein the first and second values designate routing destinations for packets which produce corresponding lookup keys.

17. A chip, comprising:
one or more ingress ports for receiving data packets; and
a memory storing a hash table, the hash table being accessible by a plurality of different flow tables;
wherein the chip is adapted to:

receive an incoming data packet having any combination of headers, including headers developed after the chip was developed;

generate a first lookup key signature based on a first header and a first of the plurality of different flow tables;

access the hash table, using the generated first lookup key signature, to determine destination information for the packet; and transmit the packet based on the destination information, wherein transmitting the packet comprises sending the packet to a second of the plurality of different flow tables.

18. The chip of claim 17, wherein the chip is further configured to:

generate a second lookup key signature based on a second header and the second of the plurality of different flow tables;

access the hash table using the generated second lookup key signature to determine next destination information for the packet; and transmit the packet based on the next destination information.

* * * * *